(12) United States Patent
Wilkes et al.

(10) Patent No.: US 11,354,181 B2
(45) Date of Patent: Jun. 7, 2022

(54) FAULT DETECTION BASED ON ENERGY CONSERVATION

(71) Applicant: Infineon Technologies AG, Neubiberg (DE)

(72) Inventors: Dyson Wilkes, Marlborough (GB); Siva Karteek Bolisetti, Bristol (GB)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 16/826,422

(22) Filed: Mar. 23, 2020

(65) Prior Publication Data

US 2021/0294688 A1    Sep. 23, 2021

(51) Int. Cl.
*G06F 11/00* (2006.01)
*G06F 11/07* (2006.01)
*G06F 7/483* (2006.01)
*G06F 17/14* (2006.01)

(52) U.S. Cl.
CPC .......... *G06F 11/0754* (2013.01); *G06F 7/483* (2013.01); *G06F 11/0721* (2013.01); *G06F 17/142* (2013.01)

(58) Field of Classification Search
CPC .. G06F 11/0754; G06F 11/0721; G06F 7/483; G06F 17/141; G06F 17/142
See application file for complete search history.

(56) References Cited

U.S. PATENT DOCUMENTS 5,018,091 A * 5/1991 du Chene ........... G06F 11/1637
708/405

\* cited by examiner

*Primary Examiner* — Philip Guyton
(74) *Attorney, Agent, or Firm* — Banner & Witcoff Ltd.

(57) ABSTRACT

A fault detector for detecting a fault in a digital processing circuit configured to transform an input data set to an output data set based on an energy conserving function. The fault detector includes an input sum of absolute squares circuit configured to determine an input sum of absolute squares value of the input data set, which has a predetermined length; an output sum of absolute squares circuit configured to determine an output sum of absolute squares value of the output data set; and an energy conservation check circuit configured to identify a fault in the digital processing circuit if a comparison based on the input sum of absolute squares value and the output sum of absolute squares value does not meet a predetermined energy conservation criteria.

18 Claims, 4 Drawing Sheets

200
Fault Detection Method

FAULT DETECTION BASED ON ENERGY CONSERVATION

BACKGROUND

A goal of the present disclosure is to improve safety with respect to digital processing circuits.

Current solutions, such as Cyclic Redundancy Check (CRC), Error Correction Codes (ECC), parity checks, and lock-step detect errors in a communications channel during data transmission or storage. CRC is not reliable due to multiple bit changes retaining parity, leading to errors being undetected. ECC has higher processing costs, and checks cannot be implemented across data transformations. Lock-step requires additional hardware to run the process twice, and has higher implementation costs to run complex functions.

DETAILED DESCRIPTION

The present disclosure is directed to a fault detector having an energy conservation check circuit configured to identify a fault in an energy-conserving digital processing circuit by comparing a sum of absolute squares of an input data set with a sum of absolute squares of an output data set of the digital processing circuit.

Figure 1A:
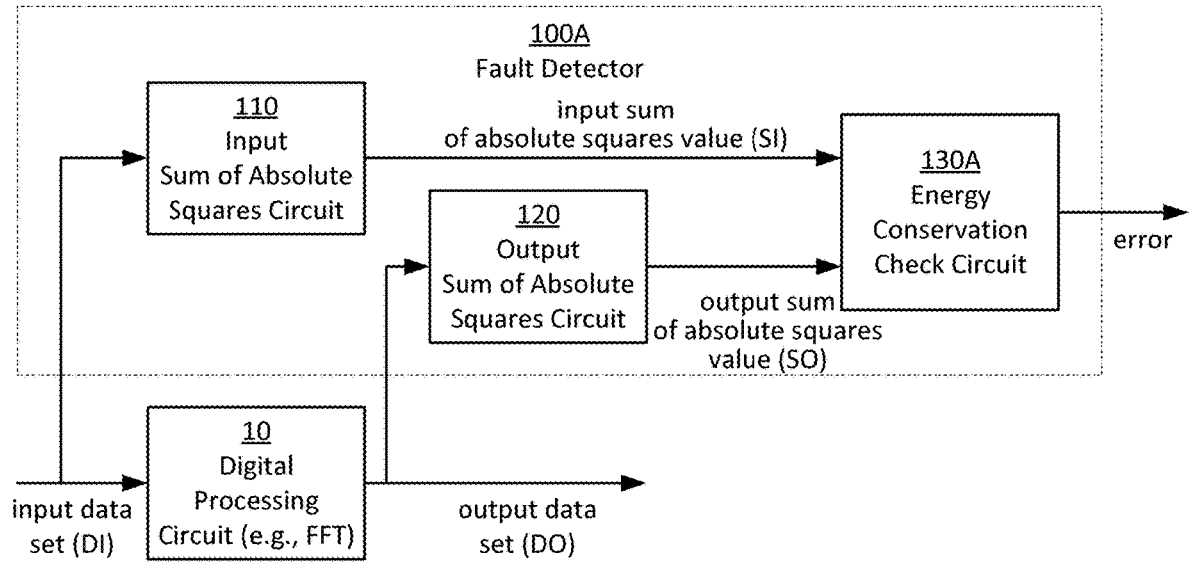
FIGS. 1A-1D illustrate schematic diagrams of a fault detector, which is coupled to a digital processing circuit, in accordance with aspects of the disclosure.

FIG. 1A illustrates a schematic diagram of a fault detector 100A, which is coupled to a digital processing circuit 10, in accordance with aspects of the disclosure.

The digital processing circuit 10 may be any circuit that conserves energy across a transformation of an input data set DI to an output data set DO, such as a transformation derived from Parseval's theorem. The digital processing circuit 10 may comprise a discrete Fourier transform circuit, and more specifically, a Fast Fourier Transform (FFT) circuit, wherein the total energy within the data set that is computed in the time domain is equal to the total energy computed in the frequency domain. Alternatively, the digital processing circuit 10 may comprise a filter with a certain frequency response.

The fault detector 100 is configured to detect a fault in the digital processing circuit 10. The fault detector 100 comprises an input sum of absolute squares circuit 110, an output sum of absolute squares circuit 120, and an energy conservation check circuit 130A.

The input sum of absolute squares circuit 110 is configured to determine an input sum of absolute squares value SI of the input data set DI, which has a predetermined length. A sum of absolute squares of value represents total energy represented in a signal. The input data set DI may comprise integers or floating point representations of real or complex numbers.

The output sum of absolute squares circuit 120 is configured to determine an output sum of absolute squares value SO of the output data set DO. The input sum of absolute squares circuit 110 and the output sum of absolute squares circuit 120 may be part of the same circuit, or preferably, physically separate circuits for better fault detection.

The energy conservation check circuit 130A is configured to identify a fault in the digital processing circuit 10 if a comparison based on the input sum of absolute squares value SI and the output sum of absolute squares value SO does not meet a predetermined energy conservation criteria. The output sum of absolute squares DO is equal to an input sum of absolute squares SI for any function that conserves energy.

The digital processing circuit 10 may be an FFT, with the data sets having a finite length of any positive non-zero integer number of data points, for example, 1,024 data points. In this example the summations begin at the first point in each of the data sets and are performed up to and including the $1{,}024^{th}$ data point. Any latency in the digital signal processing function should be consideration in timing for the data comparison.

Figure 1B:
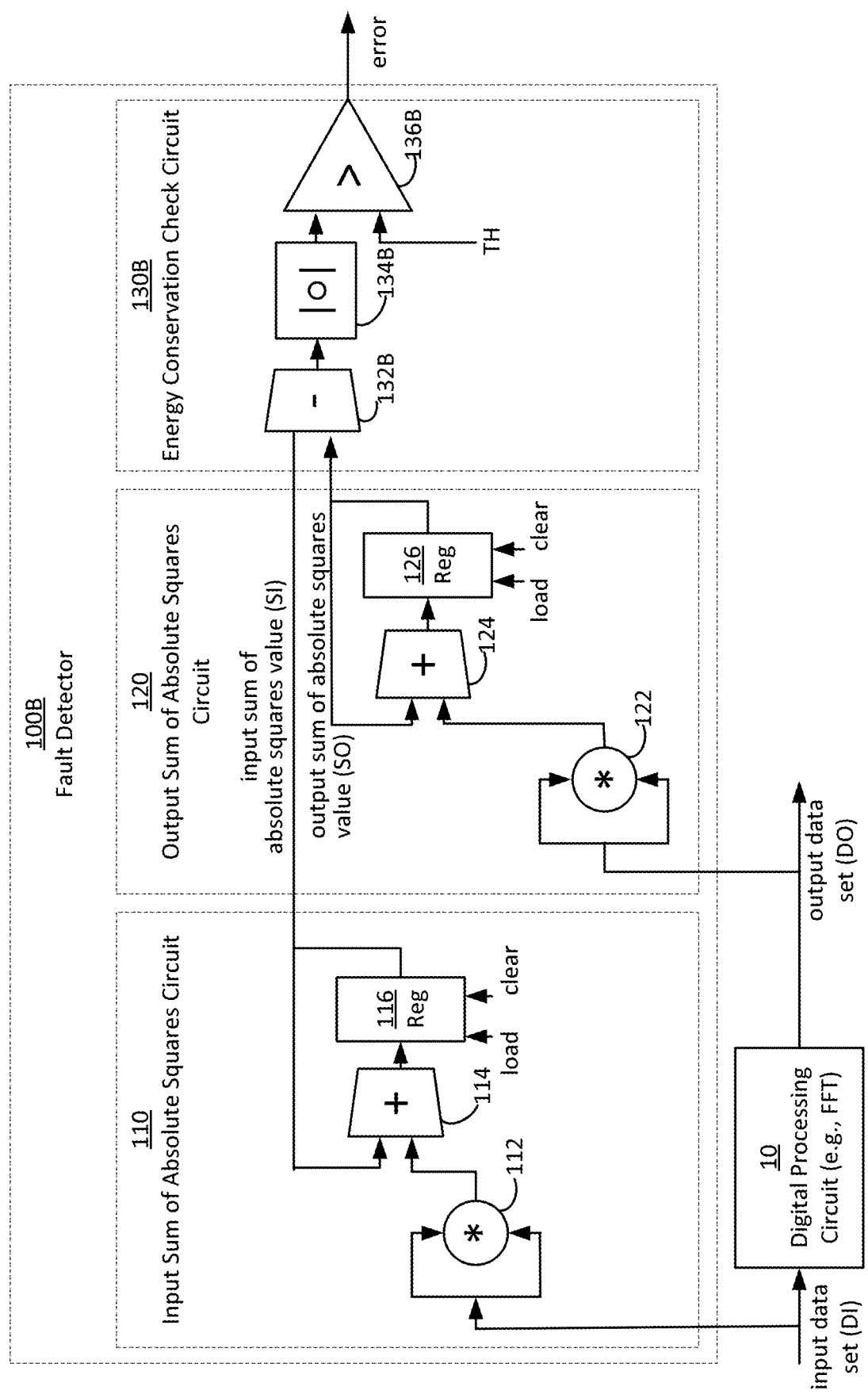

FIG. 1B illustrates a more detailed schematic diagram of a fault detector 100B in accordance with aspects of the disclosure.

The input sum of absolute squares circuit 110 comprises a multiplier 112, an adder 114, and a register 116 having load and clear controls. Similarly, the output sum of absolute squares circuit 120 comprises a multiplier 122, an adder 124, and a register 126 having load and clear controls.

During operation, the registers 116 and 126 are initially cleared to zero using the respective clear control inputs. The input data set DI is expected to arrive at the input sum of absolute squares circuit 110 one data value at a time. As each data value arrives, the multiplier 112 squares the input data value. The adder 114 adds the squared value to a current value in the register 116, and the new sum is loaded into the register 116 using the load control input. As the output data set values DO are output from the digital processing circuit 10 (i.e., the function being checked), the multiplier 122 squares the output data set values DO, and the adder 124 adds the squared value to a current value in the register 126 in the same manner as the input sum of absolute squares circuit 120. Multiplication for complex data is by the complex conjugate of the data value.

If more than one data value is expected to arrive at a same time, the multipliers 112, 122 could be duplicated and their outputs summed before being added by the adders 114, 124 to total sums.

The energy conservation check circuit 130B is configured to determine whether there is a fault in the digital processing circuit 10 by comparing the input and output sum of absolute squares values. If the input and output sum of absolute squares values are different, energy has not been conserved, thereby indicating a fault.

More specifically, the energy conservation check circuit 130B comprises a subtractor 132B, an absolute value circuit 134B, and a comparator 136B. The subtractor 132B is configured to subtract the output sum of absolute squares value SO from the input sum of absolute squares value SI, and output a difference value. The absolute value circuit 134B is configured to determine an absolute value of the difference value. The comparator 136B is configured to compare the absolute value of the difference value with a threshold value TH, and is configured to output an error signal if the absolute value of the difference value exceeds the threshold value TH. The predetermined energy conservation criteria is thus an absolute value of a difference between the input sum of absolute squares value SI and the output sum of absolute squares value SO being less than a threshold value TH. The TH value may be set based on a fault tolerance of the digital processing circuit 10. After a data set is processed and checked, the registers 116, 126 can be cleared by the clear input, and the digital processing circuit 10 checked based on a new data set.

The threshold value TH may be based on a length of the input data set DI. This is because the magnitude of the difference between the input sum of absolute squares value SI and the output sum of absolute squares value SO may be a function of a number of data points input to the digital processing circuit 10. The threshold value TH can be a fixed value or programmed, for example, according to the number of values in the data set. The threshold value TH could be read from a table stored in a memory according to the number of values N. The memory could be read-only memory (ROM), random access memory (RAM), or any other memory as suitable. If the table is stored in a RAM and the function being checked is programmable, such as in the case of the coefficients of a filter, then the table could also be programmed at the same time as the digital; processing circuit function.

Figure 1C:
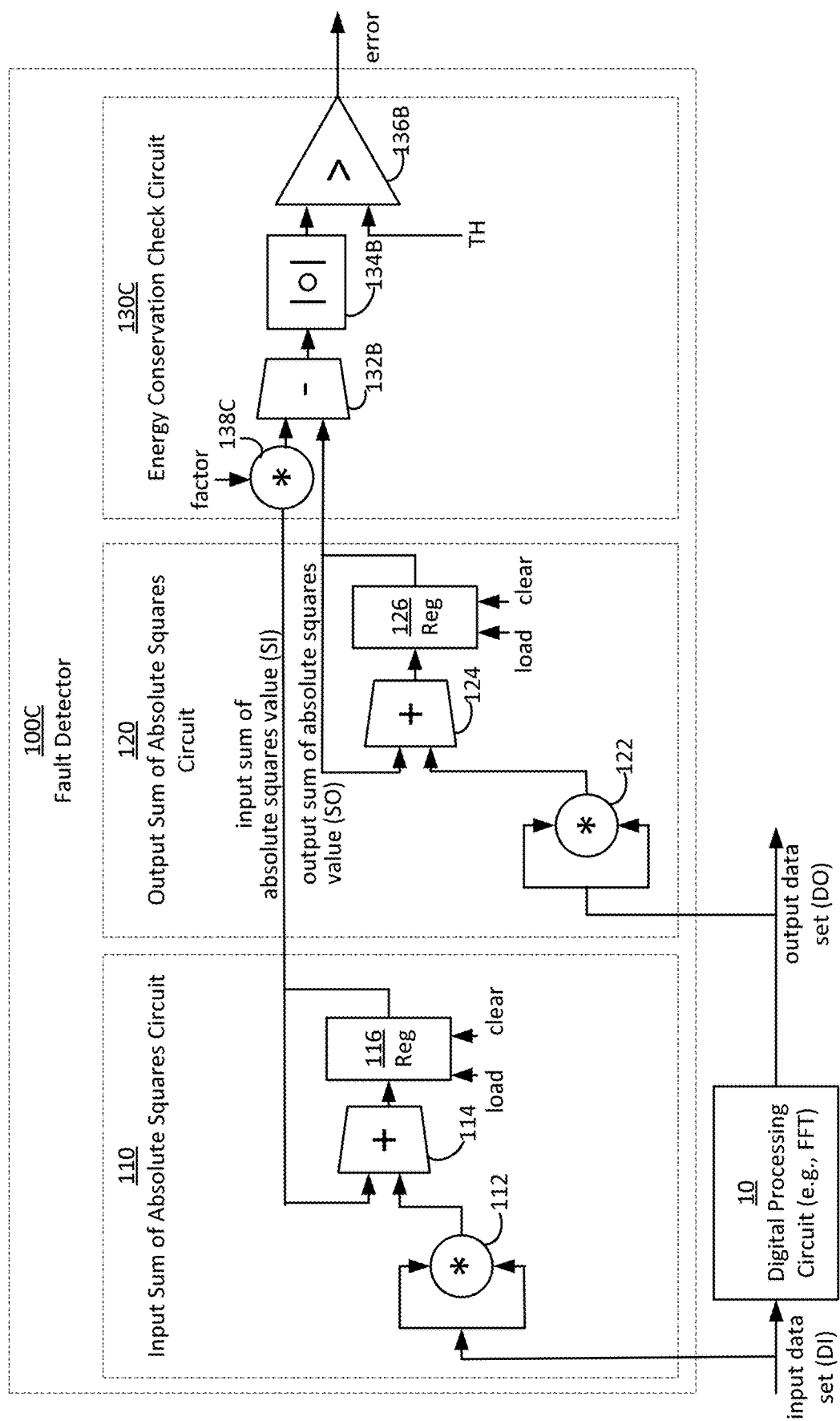

FIG. 1C illustrates a more detailed schematic diagram of an alternative fault detector 100C in accordance with aspects of the disclosure. The fault detector 100C is similar to the fault detector 100B of FIG. 1B, except a detail of the energy check conservation check circuit 130C.

The energy conservation check circuit 130C additionally comprises a multiplier 138C configured to multiply the input sum of absolute squares value SI, or alternatively the output sum of absolute squares value SO (not shown) by a factor prior to the comparison. The energy conservation check circuit 130C is applicable for a function where the input and output sum of absolute squares values SI, SO are in a relationship other than equality. The energy conservation check circuit 130C checks that a ratio of the input and output sum of absolute squares values SI, SO are within a predetermined threshold TH, which will likely have a different value from that in the example of FIG. 1B.

Figure 1D:
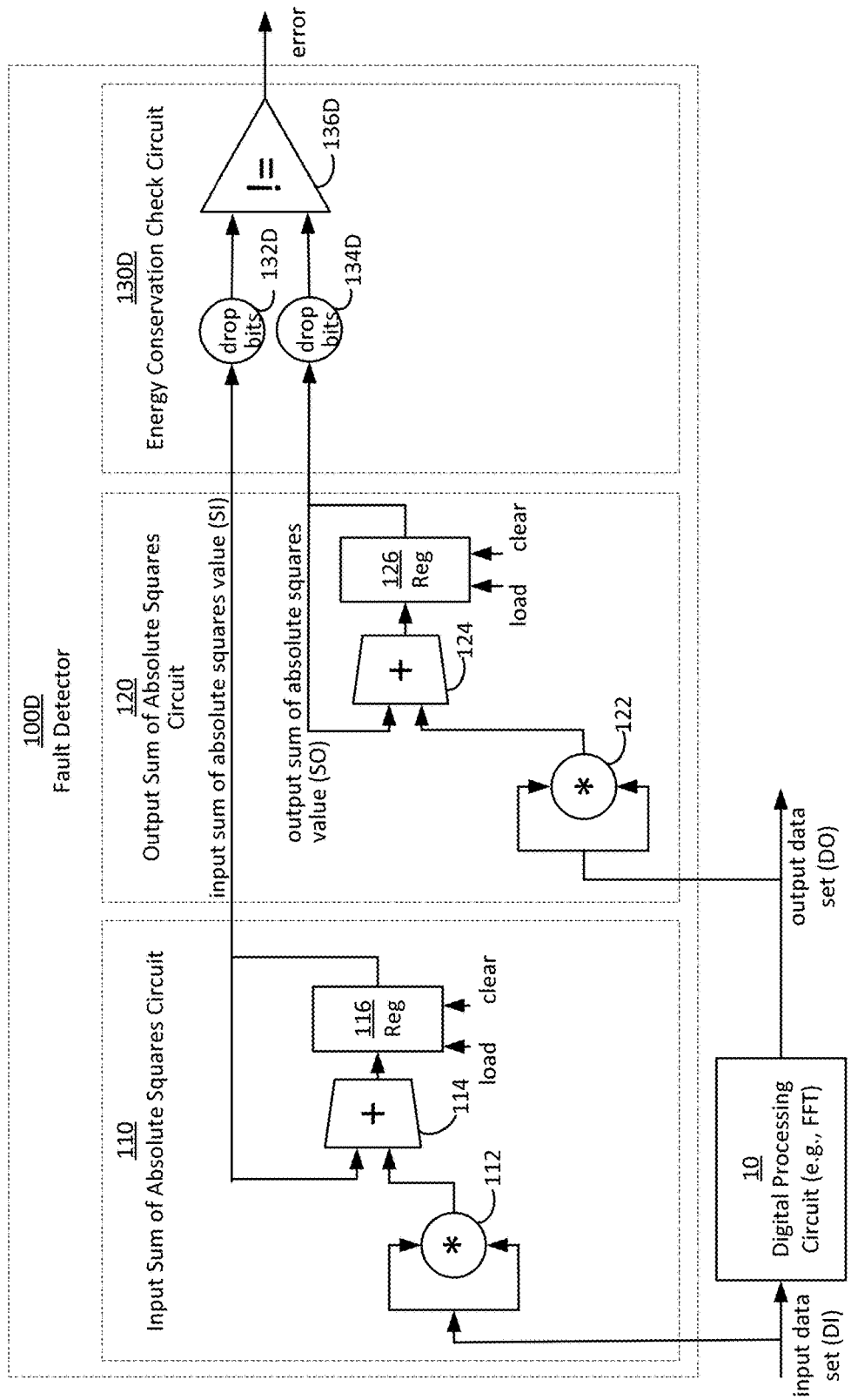

FIG. 1D illustrates a more detailed schematic diagram of an alternative fault detector 100D in accordance with aspects of the disclosure. The fault detector 100D is similar to the fault detector 100B of FIG. 1B, except for details of the energy check conservation check circuit 130D.

The energy conservation check circuit 130D comprises least significant bit drop circuits 132D, 134D and a comparator 136D. The least significant bit drop circuits 132D, 134D are configured to drop at least one least significant bit of each of the input sum of absolute squares value SI and the output sum of absolute squares value SO, respectively. The comparator 136D is configured to compare the least significant bit dropped input sum of absolute squares value and the least significant bit dropped output sum of absolute squares value. The predetermined energy conservation criteria is the least significant bit dropped input sum of absolute squares value and the least significant bit dropped output sum of absolute squares value being equal. If the predetermined energy conservation criteria is not met, the energy conservation check circuit 130D outputs an error signal indicating a fault in the digital processing circuit.

Figure 2:
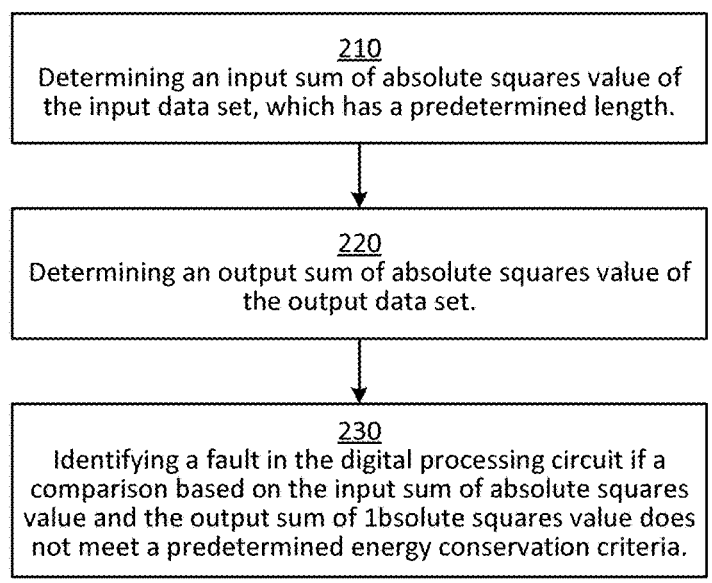
FIG. 2 illustrates a flowchart of a fault detection method in accordance with aspects of the disclosure.

FIG. 2 illustrates a flowchart of a fault detection method 200 in accordance with aspects of the disclosure. The fault detection method 200 is for detecting a fault in a digital processing circuit 10 configured to transform an input data set DI to an output data set DO based on an energy conserving function.

In Step 210, an input sum of absolute squares circuit 110 determines an input sum of absolute squares value SI of the input data set DI, which has a predetermined length.

In Step 220, an output sum of absolute squares circuit 120 determines an output sum of absolute squares value SO of the output data set DO.

In Step 230, an energy conservation check circuit 130 identifies a fault in the digital processing circuit 10 if a comparison based on the input sum of absolute squares value SI and the output sum of absolute squares value SO does not meet a predetermined energy conservation criteria.

The identifying of Step 230 comprises subtracting, by a subtractor 132B, the output sum of absolute squares value SO from the input sum of absolute squares value SI, and determining, by an absolute value circuit 134B, an absolute value of the difference value of the subtractor 132B. The predetermined energy conservation criteria is the absolute value of the difference value being less than a threshold value TH.

Alternatively, the identifying of Step 230 comprises dropping, by a least significant bit drop circuit 132D, 134D, at least one least significant bit of each of the input sum of absolute squares absolute value SI and the output sum of absolute squares value SO. The comparing comprises comparing the least significant bit dropped input sum of absolute squares value and the least significant bit dropped output sum of absolute squares value, and the predetermined energy conservation criteria is the least significant bit dropped input sum of absolute squares value and the least significant bit dropped output sum of absolute squares value being equal.

The digital processing circuit 10 may be a fixed point digital processing circuit, a floating point digital processing circuit, or a block floating point digital processing circuit. The type of circuit may impact the threshold value TH. For example, a floating point circuit is generally more accurate, and thus the threshold value could be lower than for a fixed point circuit.

The fault detector 100 disclosed herein is advantageous in that a complex function such as FFT is implemented only once, thereby reducing implementation costs. Also, a sum of squares function is a low complexity function that is implemented easily and, in some cases, already present.

The fault detector 100 may detect faults as they occur, such as during data transmission/storage or during data transformation/processing. And for complex functions such as FFT, the implementation cost in terms of silicon area of a sum of powers function is significantly less than for duplicating a function for redundancy.

The techniques of this disclosure may also be described in the following examples.

EXAMPLE 1

A fault detector for detecting a fault in a digital processing circuit configured to transform an input data set to an output data set based on an energy conserving function, the fault detector comprising: an input sum of absolute squares circuit configured to determine an input sum of absolute squares value of the input data set, which has a predetermined length; an output sum of absolute squares circuit configured to determine an output sum of absolute squares value of the output data set; and an energy conservation check circuit configured to identify a fault in the digital processing circuit if a comparison based on the input sum of absolute squares value and the output sum of absolute squares value does not meet a predetermined energy conservation criteria.

EXAMPLE 2

The fault detector of example 1, wherein the digital processing circuit comprises a discrete Fourier transform circuit.

EXAMPLE 3

The fault detector of example 2, wherein the discrete Fourier transform circuit is a Fast Fourier Transform (FFT) circuit.

EXAMPLE 4

The fault detector of example 1, wherein the digital processing circuit comprises a filter.

EXAMPLE 5

The fault detector of example 1, wherein the predetermined energy conserving criteria is the input sum of absolute squares value being substantially equal to the output sum of absolute squares value.

EXAMPLE 6

The fault detector of example 1, wherein the predetermined energy conservation criteria is an absolute value of a difference between the input sum of absolute squares value and the output sum of absolute squares value being less than a threshold value.

EXAMPLE 7

The fault detector of example 6, wherein the threshold value is based on a length of the input data set.

EXAMPLE 8

The fault detector of example 6, wherein the threshold value is read from a table stored in a memory.

EXAMPLE 9

The fault detector of example 1, wherein the energy conservation check circuit comprises: a subtractor configured to subtract the output sum of absolute squares value from the input sum of absolute squares value, and output a difference value; and a comparator configured to output an error signal if the difference value exceeds a threshold value.

EXAMPLE 10

The fault detector of example 9, wherein the energy conservation check circuit comprises: an absolute value circuit configured to determine an absolute value of the difference value, wherein the comparator is configured to compare the absolute value of the difference value with the threshold value.

EXAMPLE 11

The fault detector of example 1, wherein the energy conservation check circuit comprises: a least significant bit drop circuit configured to drop at least one least significant bit of each of the input sum of absolute squares value and the output sum of absolute squares value; and a comparator configured to compare the least significant bit dropped input sum of absolute squares value and the least significant bit dropped output sum of absolute squares value, wherein the predetermined energy conservation criteria is the least significant bit dropped input sum of absolute squares value and the least significant bit dropped output sum of absolute squares value being equal.

EXAMPLE 12

The fault detector of example 1, wherein the energy conservation check circuit comprises: a multiplier configured to multiply the input sum of absolute squares value or the output sum of absolute squares value by a factor prior to the comparison, wherein the predetermined energy conservation criteria is based on a ratio.

EXAMPLE 13

The fault detector of example 1, wherein the input data set comprises complex numbers.

EXAMPLE 14

The fault detector of example 1, wherein the input sum of absolute squares circuit and the output sum of absolute squares circuit are physically separate circuits.

EXAMPLE 15

The fault detector of example 1, wherein the digital processing circuit is a fixed point digital processing circuit.

EXAMPLE 16

The fault detector of example 1, wherein the digital processing circuit is a floating point digital processing circuit.

EXAMPLE 17

The fault detector of example 16, wherein the digital processing circuit is a block floating point digital processing circuit.

EXAMPLE 18

A fault detection method for detecting a fault in a digital processing circuit configured to transform an input data set to an output data set based on an energy conserving function, the fault detection method comprising: determining, by an input sum of absolute squares circuit, an input sum of absolute squares value of the input data set, which has a predetermined length; determining, by an output sum of absolute squares circuit, an output sum of absolute squares value of the output data set; and identifying, by an energy conservation check circuit, a fault in the digital processing circuit if a comparison based on the input sum of absolute squares value and the output sum of absolute squares value does not meet a predetermined energy conservation criteria.

EXAMPLE 19

The fault detection method of example 18, wherein the identifying comprises: subtracting, by a subtractor, the output sum of absolute squares value from the input sum of absolute squares value; and determining, by an absolute value circuit, an absolute value of the difference value of the subtractor, wherein the predetermined energy conservation criteria is the absolute value of the difference value being less than a threshold value.

EXAMPLE 20

The fault detection method of example 18, wherein the identifying comprises dropping, by a least significant bit drop circuit, at least one least significant bit of each of the input sum of absolute squares value and the output sum of absolute squares value, and wherein the comparing comprises comparing the least significant bit dropped input sum of absolute squares value and the least significant bit dropped output sum of absolute squares value, and the predetermined energy conservation criteria is the least significant bit dropped input sum of absolute squares value and the least significant bit dropped output sum of absolute squares value being equal.

While the foregoing has been described in conjunction with exemplary embodiment, it is understood that the term "exemplary" is merely meant as an example, rather than the best or optimal. Accordingly, the disclosure is intended to cover alternatives, modifications and equivalents, which may be included within the scope of the disclosure.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. This disclosure is intended to cover any adaptations or variations of the specific embodiments discussed herein.

What is claimed is:

1. A fault detector for detecting a fault in a digital processing circuit configured to receive and transform an input data set to an output data set based on an energy conserving function, the fault detector comprising:
   an input sum of absolute squares circuit configured to receive the input data set and output a first signal having an input sum of absolute squares value of the input data set, which has a predetermined length;
   an output sum of absolute squares circuit configured to receive the output data set from the digital processing circuit and output a second signal having an output sum of absolute squares value of the output data set; and
   an energy conservation check circuit configured to identify a fault in the digital processing circuit if a comparison based on the input sum of absolute squares value of the first signal received from the input sum of absolute squares circuit and the output sum of absolute squares value of the second signal received from the output sum of absolute squares circuit does not meet a predetermined energy conservation criteria, wherein the energy conservation check circuit comprises:
   a least significant bit drop circuit configured to drop at least one least significant bit of each of the input sum of absolute squares value and the output sum of absolute squares value; and
   a comparator configured to compare the least significant bit dropped input sum of absolute squares value and the least significant bit dropped output sum of absolute squares value,
   wherein the predetermined energy conservation criteria is the least significant bit dropped input sum of absolute squares value and the least significant bit dropped output sum of absolute squares value being equal.

2. The fault detector of claim 1, wherein the digital processing circuit comprises a discrete Fourier transform circuit.

3. The fault detector of claim 2, wherein the discrete Fourier transform circuit is a Fast Fourier Transform (FFT) circuit.

4. The fault detector of claim 1, wherein the digital processing circuit comprises a filter.

5. The fault detector of claim 1, wherein the predetermined energy conserving criteria is the input sum of absolute squares value being substantially equal to the output sum of absolute squares value.

6. The fault detector of claim 1, wherein the predetermined energy conservation criteria is an absolute value of a difference between the input sum of absolute squares value and the output sum of absolute squares value being less than a threshold value.

7. The fault detector of claim 6, wherein the threshold value is based on a length of the input data set.

8. The fault detector of claim 6, wherein the threshold value is read from a table stored in a memory.

9. The fault detector of claim 1, wherein the energy conservation check circuit comprises:
   a subtractor configured to subtract the output sum of absolute squares value from the input sum of absolute squares value, and output a difference value; and
   a comparator configured to output an error signal if the difference value exceeds a threshold value.

10. The fault detector of claim 9, wherein the energy conservation check circuit comprises:
    an absolute value circuit configured to output a third signal having an absolute value of the difference value,
    wherein the comparator is configured to compare the absolute value of the difference value with the threshold value.

11. The fault detector of claim 1, wherein the energy conservation check circuit comprises:
    a multiplier configured to multiply the input sum of absolute squares value or the output sum of absolute squares value by a factor prior to the comparison,
    wherein the predetermined energy conservation criteria is based on a ratio.

12. The fault detector of claim 1, wherein the input data set comprises complex numbers.

13. The fault detector of claim 1, wherein the digital processing circuit is a fixed point digital processing circuit.

14. The fault detector of claim 1, wherein the digital processing circuit is a floating point digital processing circuit.

15. The fault detector of claim 14, wherein the digital processing circuit is a block floating point digital processing circuit.

16. A fault detector for detecting a fault in a digital processing circuit configured to receive and transform an input data set to an output data set based on an energy conserving function, the fault detector comprising:
   an input sum of absolute squares circuit configured to receive the input data set and output a first signal having an input sum of absolute squares value based on the input data set, which has a predetermined length;
   an output sum of absolute squares circuit configured to receive the output data set from the digital processing circuit and output a second signal having an output sum of absolute squares value based on the output data set, wherein the input sum of absolute squares circuit and the output sum of absolute squares circuit are physically separate circuits; and an energy conservation check circuit configured to identify a fault in the digital processing circuit if a comparison based on the input sum of absolute squares value of the first signal received from the input sum of absolute squares circuit and the output sum of absolute squares value of the second signal received from the output sum of absolute squares circuit does not meet a predetermined energy conservation criteria.

17. A fault detection method for detecting a fault in a digital processing circuit configured to receive and transform an input data set to an output data set based on an energy conserving function, the fault detection method comprising:

receiving the input data set and outputting, by an input sum of absolute squares circuit, a first signal having an input sum of absolute squares value of the input data set, which has a predetermined length;

receiving the output data set from the digital processing circuit and outputting, by an output sum of absolute squares circuit, a second signal having an output sum of absolute squares value of the output data set; and identifying, by an energy conservation check circuit, a fault in the digital processing circuit if a comparison based on the input sum of absolute squares value of the first signal received from the input sum of absolute squares circuit and the output sum of absolute squares value of the second signal received from the input sum of absolute squares circuit does not meet a predetermined energy conservation criteria, wherein the identifying comprises dropping, by a least significant bit drop circuit, at least one least significant bit of each of the input sum of absolute squares value and the output sum of absolute squares value, and wherein the comparing comprises comparing the least significant bit dropped input sum of absolute squares value and the least significant bit dropped output sum of absolute squares value, and the predetermined energy conservation criteria is the least significant bit dropped input sum of absolute squares value and the least significant bit dropped output sum of absolute squares value being equal.

18. The fault detection method of claim 17, wherein the identifying comprises:

subtracting, by a subtractor, the output sum of absolute squares value from the input sum of absolute squares value; and outputting, by an absolute value circuit, a third signal having an absolute value of the difference value of the subtractor, wherein the predetermined energy conservation criteria is the absolute value of the difference value being less than a threshold value.

* * * * *